United States Patent
Huang et al.

(10) Patent No.: US 9,619,424 B2
(45) Date of Patent: Apr. 11, 2017

(54) SUPPORTING UNRECOGNIZED PROTOCOL IN WIRELESS DOCKING

(71) Applicant: QUALCOMM Incorporated, San Diego, CA (US)

(72) Inventors: Xiaolong Huang, San Jose, CA (US); Shivraj Singh Sandhu, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 14/224,451

(22) Filed: Mar. 25, 2014

(65) Prior Publication Data

US 2015/0100715 A1 Apr. 9, 2015

Related U.S. Application Data

(60) Provisional application No. 61/889,014, filed on Oct. 9, 2013, provisional application No. 61/902,519, filed on Nov. 11, 2013.

(51) Int. Cl.
*G06F 13/40* (2006.01)
*H04L 29/08* (2006.01)
(Continued)

(52) U.S. Cl.
CPC ........ *G06F 13/4081* (2013.01); *G06F 1/1632* (2013.01); *H04L 67/16* (2013.01);
(Continued)

(58) Field of Classification Search
None
See application file for complete search history.

(56) References Cited

U.S. PATENT DOCUMENTS 7,865,628 B2 * 1/2011 Konno ................ G06F 13/4221
710/10
2012/0265913 A1 * 10/2012 Suumaki ............... H04W 4/008
710/303
(Continued)

FOREIGN PATENT DOCUMENTS

WO WO-2012117306 A1 9/2012

OTHER PUBLICATIONS

IPEA/EPO, Second Written Opinion of the International Preliminary Examining Authority, Int'l. App. No. PCT/US2014/058104, Sep. 21, 2015, European Patent Office, Munich, DE, 5 pgs.
(Continued)

*Primary Examiner* — Idriss N Alrobaye
*Assistant Examiner* — Dayton Lewis-Taylor
(74) *Attorney, Agent, or Firm* — Holland & Hart LLP

(57) ABSTRACT

Methods, systems, and devices are described for supporting unknown peripheral function protocols (PFP) with a wireless docking station. A wireless docking station may facilitate connections between a wireless dockee and peripherals employing both recognized and unrecognized PFPs. A docking station may request one or more service discovery parameters from a peripheral having an unrecognized PFP. The docking station may receive service discovery parameters in response, convey the received discovery parameters to a wireless dockee, and facilitate discovery and a connection between the device and the peripheral. The discovery parameters may include various identifiers related to peripheral function, identity, and location.

16 Claims, 9 Drawing Sheets

(51) Int. Cl.
*G06F 1/16* (2006.01)
*H04M 1/725* (2006.01)
*H04W 8/00* (2009.01)
*H04M 1/04* (2006.01)

(52) U.S. Cl.
CPC ......... *H04M 1/7253* (2013.01); *H04W 8/005* (2013.01); *H04M 1/04* (2013.01)

(56) References Cited

U.S. PATENT DOCUMENTS

| | | |
|---|---|---|
| 2013/0067534 A1 | 3/2013 | Soffer |
| 2013/0090061 A1 | 4/2013 | Linde |
| 2013/0145050 A1 | 6/2013 | Huang et al. |
| 2013/0297844 A1 | 11/2013 | Rosenberg et al. |
| 2013/0309973 A1 | 11/2013 | Raveendran et al. |
| 2014/0013014 A1 | 1/2014 | Huang et al. |

OTHER PUBLICATIONS

ISA/EPO, International Search Report and Written Opinion of the International Searching Authority, Int'l. App. No. PCT/US2014/058104, Dec. 22, 2014, European Patent Office, Rijswijk, NL, 17 pgs.

* cited by examiner

SUPPORTING UNRECOGNIZED PROTOCOL IN WIRELESS DOCKING

CROSS REFERENCES

The present Application for Patent claims priority to U.S. Provisional Patent Application No. 61/889,014 by Huang et al., entitled "Supporting Unrecognized PFPs in Wireless Docking," filed Oct. 9, 2013, and claims priority to U.S. Provisional Patent Application No. 61/902,519 by Huang et al., entitled "Supporting Unrecognized PFPs in Wireless Docking," filed Nov. 11, 2013, and each of which is assigned to the assignee hereof, and expressly incorporated by reference herein.

BACKGROUND

The following relates generally to wireless communication, and more specifically to wireless docking stations for electronic devices. Wireless docking stations, which are also referred to as docking stations, wireless docking centers, or docks, may be used to connect a computer to various peripheral devices, including monitors, keyboards, mice, printers, scanners, cameras, and the like. Docking stations may be used in conjunction, or to facilitate communication with laptop computers, notebook computers, netbooks, tablets, smartphones, PDAs, and other similar electronic devices.

In some cases, docking stations are able to communicate with peripherals using a peripheral function protocol (PFP) known to the docking station. But sometimes, peripherals may employ PFPs (e.g., proprietary PFPs) that are unknown to a docking station. In such cases, it may be beneficial for a docking station to gather certain information from the peripheral and convey that information to another device, notwithstanding the unknown PFP.

SUMMARY

The described features generally relate to one or more methods, systems, and apparatuses for supporting unknown PFPs with a docking station. A docking station may request one or more service discovery parameters from a peripheral having an unknown PFP; and the docking station may convey those parameters to an electronic device in order to facilitate discovery and a connection between the device and the peripheral.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

According to a set of illustrative embodiments, a method for wireless communications may include: requesting, by a wireless docking station, a service discovery parameter from a peripheral device having an unrecognized peripheral function protocol, the parameter comprising a transport protocol identifier or a port identifier; receiving the parameter from the peripheral device in response to the request; and transmitting service discovery information to a wireless dockee, where the service discovery information is based at least in part on the parameter received from the peripheral device. In certain examples, the service discovery information may be generated by repackaging the parameter at the wireless docking station.

In certain examples, the wireless docking station may facilitate a connection between the wireless dockee and the peripheral device based at least in part on the service discovery information. In certain examples, the unrecognized protocol may include a proprietary peripheral function protocol (PFP). In certain examples, the parameter from the peripheral device may include both the transport protocol identifier and the port identifier.

In certain examples, the parameter may include at least one of: a PFP name of an unrecognized PFP associated with the peripheral device, an advertisement identifier associated with the peripheral device, a service name associated with the peripheral device, a network address associated with the peripheral device, application service information data associated with the peripheral device, or a network role associated with the peripheral device.

According to a second set of illustrative embodiments, a wireless docking station apparatus may include: a parameter requester configured to request a service discovery parameter from a peripheral device having an unrecognized peripheral function protocol, the parameter comprising a transport protocol identifier or a port identifier; a parameter receiver configured to receive the service discovery parameter from the peripheral device in response to a request from the requester; and a transmitter configured to transmit service discovery information to a wireless dockee, the service discovery information based at least in part on the parameter received from the peripheral device.

In certain examples, the wireless docking station apparatus may implement one or more aspects of the method described above with respect to the first set of illustrative embodiments. For example, the apparatus may include additional modules and/or a processor configured to implement one or more of the examples of the method described above with respect to the first set of illustrative embodiments.

According to a third set of illustrative embodiments, a wireless docking station apparatus may include: means for requesting a service discovery parameter from a peripheral device having an unrecognized peripheral function protocol, the parameter comprising a transport protocol identifier or a port identifier; means for receiving the parameter from the peripheral device in response to the request; and means for transmitting service discovery information to a wireless dockee, the service discovery information based at least in part on the parameter received from the peripheral device.

In certain examples, the wireless docking station apparatus may implement one or more aspects of the method described above with respect to the first set of illustrative embodiments. For example, the wireless docking station may include means for implementing one or more of the examples of the method described above with respect to the first set of illustrative embodiments.

According to a fourth set of illustrative embodiments, a computer program product may include a non-transitory computer-readable medium comprising computer-readable program code embodied thereon. The computer-readable program code may be configured to cause a processor to: request a service discovery parameter from a peripheral device having an unrecognized peripheral function protocol, the parameter comprising a transport protocol identifier or a port identifier; receive the parameter from the peripheral device in response to the request; and transmit discovery information to a wireless dockee, the discovery information based at least in part on the parameter received from the peripheral device.

In certain examples, the computer program product may implement one or more aspects of the method described above with respect to the first set of illustrative embodiments. For example, the computer-readable program code may cause the processor to implement one or more of the examples of the method described above with respect to the first set of illustrative embodiments.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If, in an instance in the specification, only the first reference label, the description is applicable to any one of the similar components having the same first reference label irrespective of the second reference label.

DETAILED DESCRIPTION

Figure 1:
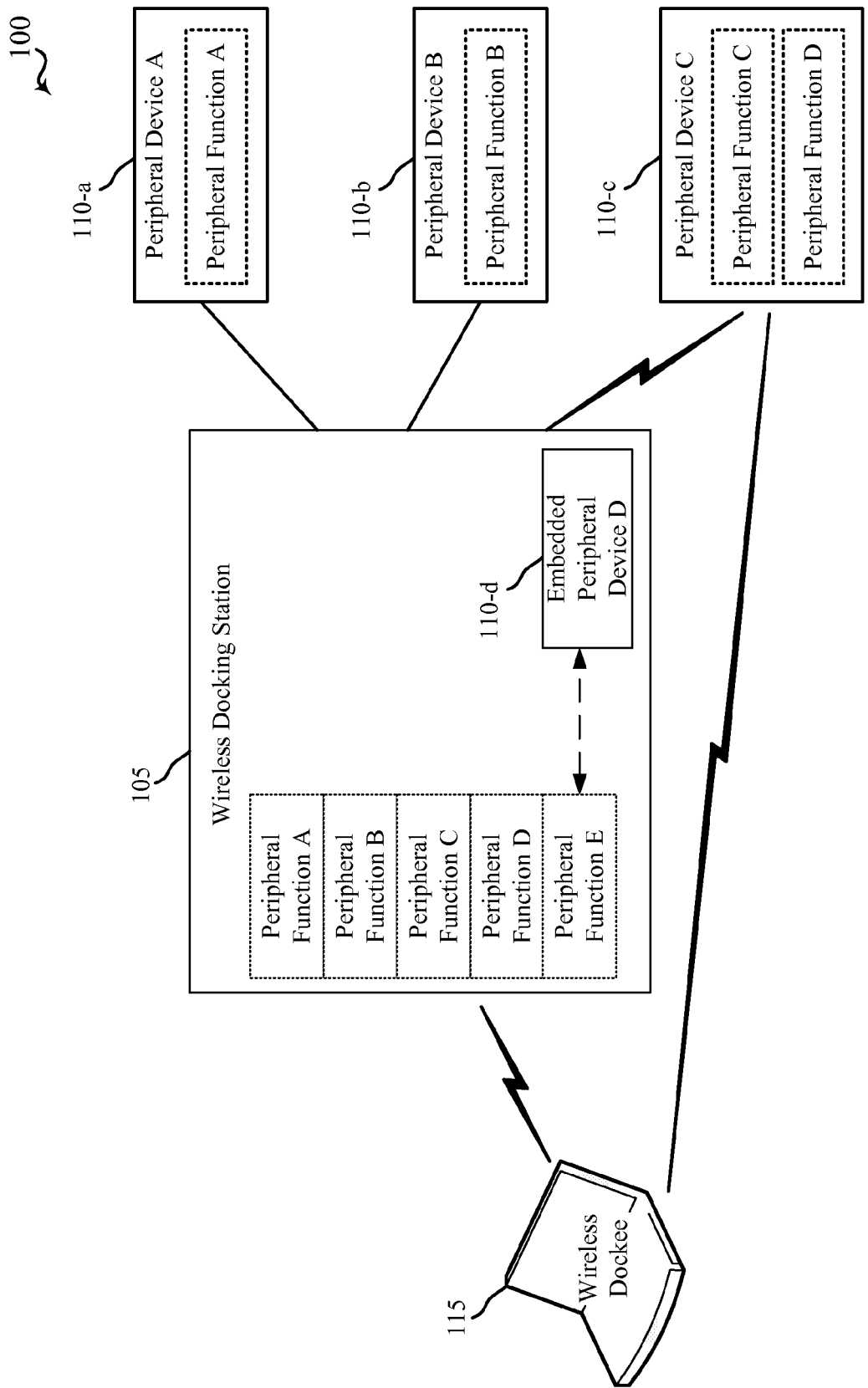
FIG. 1 shows a block diagram of a wireless communications system according to various aspects of the present disclosure.

Methods, systems, and apparatuses are described for supporting unknown PFPs in wireless docking. A docking station may request one or more service discovery parameters from a peripheral having an unknown PFP. The docking station may convey those parameters to an electronic device in order to facilitate discovery and a connection between the device and the peripheral.

The various techniques described herein for supporting unknown PFPs are generally described with respect to WLAN or Wi-Fi networks. A WLAN or Wi-Fi network may refer to a network that is based on the protocols described in the various IEEE 802.11 standards (e.g., IEEE 802.11a/g, 802.11n, 802.11ac, 802.11 ad, 802.11ah, etc.), for example. However, the same or similar techniques may also be used in any wireless network (e.g., a cellular network). For example, the same or similar techniques may be used for various wireless communications systems such as cellular wireless systems, Peer-to-Peer wireless communications, ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), Wi-Fi, IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates a wireless communications system 100 according to various embodiments. The system 100 includes a wireless docking station 105, peripheral devices 110, and a wireless dockee 115. The peripheral devices 110 may be electronic devices that each has one or more peripheral functions. For example, the peripheral device 110-*a* may be a mouse with a peripheral function of controlling a pointer on a graphical user interface. In some embodiments, the peripheral device 110-*b* is a keyboard with a peripheral function of user input. The peripheral device 110-c may be a multi-function printer, for example, with peripheral functions of printing and scanning. Additionally or alternatively, the wireless docking station 105 may include embedded peripherals, such as the peripheral device 110-d. Some or all of the peripheral devices 110 may be connected to and/or in communication with the wireless docking station 105.

The wireless dockee 115 may wirelessly connect to the wireless docking station 105, for example, utilizing Wi-Fi. The wireless dockee 115 may seek out or connect to the wireless docking station 105 based at least in part on the peripheral functions available via the wireless docking station 105. Thus, the wireless docking station 105 may advertise the peripheral functions, and thus the peripheral devices, available to a wireless dockee 115. Once connected to (e.g., docked) the wireless docking station 105, the wireless dockee 115 may exploit the peripheral functions available through the wireless docking station 105.

The wireless docking station 105 may support a variety of known and/or common PFPs. For example, the wireless docking station 105 may support Miracast, universal serial bus (USB), IEEE 802.11ad ("WiGig"), Universal Plug and Play (UPnP), and/or Wi-Fi Direct Services Application Service Platform (WFDS ASP). Some of the peripherals 110 may employ such known PFPs, and the wireless docking station 105 may thus readily transmit service discovery information (also referred to as discovery information) related to these peripherals 110 to the wireless dockee 115. In some cases, however, a peripheral device 110 may utilize an unknown PFP. For example, a peripheral device 110 may employ a proprietary PFP. The wireless docking station 105 may therefore request one or more service discovery parameters from a peripheral device 110.

Figure 2:
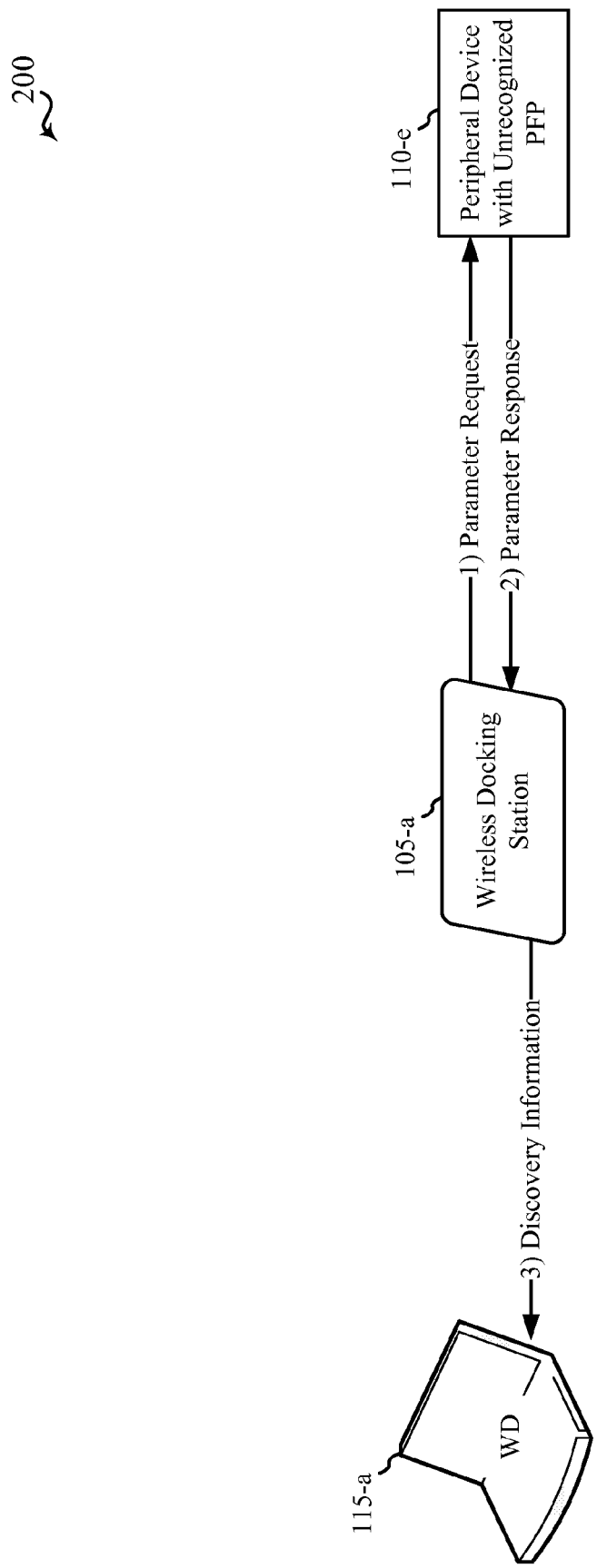
FIG. 2 shows a block diagram of a wireless communications system according to various aspects of the present disclosure.

Next, turning to FIG. 2, a block diagram depicts a wireless communication system 200 according to various embodiments. The system 200 may be an example of aspects of the system 100. The system 200 includes a wireless docking station 105-a, a peripheral device 110-e, and a wireless dockee 115-a. Each of these may be examples of the corresponding devices of the system 100.

In some embodiments, the peripheral device 110-e is a peripheral device with an unrecognized or unknown PFP. The peripheral device 110-e may be external to the wireless docking station 105-a, or it may be embedded in the wireless docking station 105-a. The wireless docking station 105-a may request from the peripheral device 110-e service discovery parameters, including a transport protocol identifier or a port identifier, or both. The peripheral device 110-e may respond by sending the requested service discovery parameters to the wireless docking station 105-a. The wireless docking station 105-a, in turn, may transmit to the wireless dockee 115-a service discovery information pertaining to the peripheral device 110-e. The service discovery information may be based at least in part on the received service discovery parameters. For example, the service discovery information may include the received service discovery parameters. In some embodiments, the wireless docking station 105 generates the service discovery information by repackaging the received parameters, and then transmits the service discovery information to the wireless dockee 115.

The wireless docking station 105-a may request any of several service discovery parameters from the peripheral devices 110-e. By way of example, the wireless docking station 105-a may request a PFP name, an advertisement identifier, a service name, a network address, application service information data, or a network role; or it may request any combination of such parameters. The wireless docking station 105-a may incorporate any or all these service discovery parameters into the service discovery information that it transmits to the wireless dockee 115-a. In some embodiments, the wireless docking station 105-a facilitates a connection between the wireless dockee 115-a and the peripheral device 110-e based at least in part on the service discovery information. The wireless dockee 115-a may thus connect with and utilize one or more peripheral functions of the peripheral device 110-e based at least in part on service discovery information provided by the wireless docking station 105-a, notwithstanding the unrecognized PFP of the peripheral device 110-e.

In some cases, the wireless docking station 105-a may also request a peripheral device 110-e using an unrecognized PFP to provide additional information. For example, if the peripheral device 110-e employs an unrecognized (e.g., a proprietary) PFP, the wireless docking station 105-e may request that the peripheral device 110-e provide the name of the unrecognized PFP. The peripheral device 110-e may provide the name of the unrecognized PFP in a specific element or sub-element of a network protocol known and utilized by the wireless docking station 105-a, the peripheral device 110-e, and/or the wireless dockee 115-a. The wireless docking station 105-a may, in turn, provide the name of the unrecognized PFP to the wireless dockee 115-a as part of the service discovery information.

The wireless docking station 105-a, the peripheral device 110-e, and the wireless dockee 115-a may employ one or more networking protocols for requesting and exchanging PFP parameters and/or service discovery information. In various embodiments, the devices may utilize UPnP, WFDS ASP, and/or Extensible Mark-up Language (XML). The various parameters and service discovery information may thus occupy specific elements of sub-elements of a WFDS APS or XML string. By way of example, a simple XML type "PfpName" may identify the name of a PFP. The simple XML type "PfpNameEnum" may identify the name of a standard PFP; and the simple XML type "PfpNameAnyString may identify the names of unknown or unrecognized PFPs. The wireless docking station 105-a may thus advertise both standardized and non-standardized (e.g., proprietary) PFPs.

Figure 3:
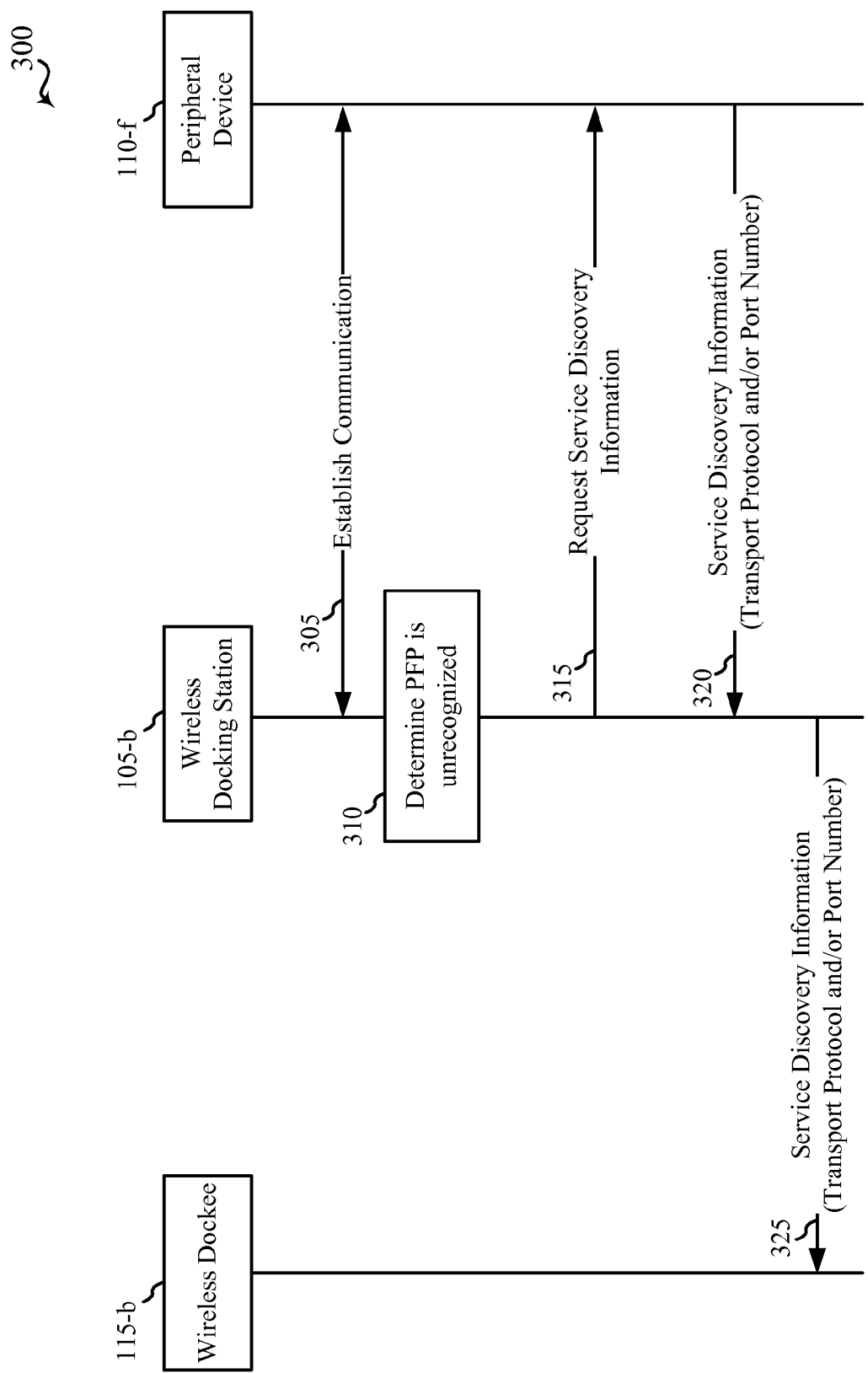
FIG. 3 shows a call flow diagram illustrating communication in a wireless communication system according to various aspects of the present disclosure.

FIG. 3 is a call flow diagram 300 illustrating communication in a wireless communication system according to various embodiments. The diagram 300 may illustrate aspects of the systems 100 and 200 described with reference to FIGS. 1 and 2. The diagram 300 includes a wireless docking station 105-b, a peripheral device 110-f, and a wireless dockee 115-b. Each of these may be examples of corresponding devices of systems 100 and 200.

The wireless docking station 105-b may establish communication 305 with the peripheral device 110-f. The peripheral device 110-f may be external to or embedded in the wireless docking station 105-b. Upon establishing communication 305, the wireless docking station 105-b may determine that the peripheral device 110-f employs an unrecognized or unknown PFP 310. The wireless docking station 105-b may thus request service discovery information or parameters 315 from the peripheral device 110-f. If the peripheral device 110-f is embedded in the wireless docking station 105-b, the wireless docking station 105-b may also request parameters of the PFP that drive the use of the peripheral device 110-f. In response, the peripheral device 110-f may transmit service discovery information or parameters 320. An embedded peripheral device 110-f may also transmit additional driver parameters. Upon receiving the service discovery information, the wireless docking station 105-*b* may transmit the service discovery information 325 to the wireless dockee 115-*b*. The service discovery information 325 includes, for example, a transport protocol or a port number, or both.

Figure 4:
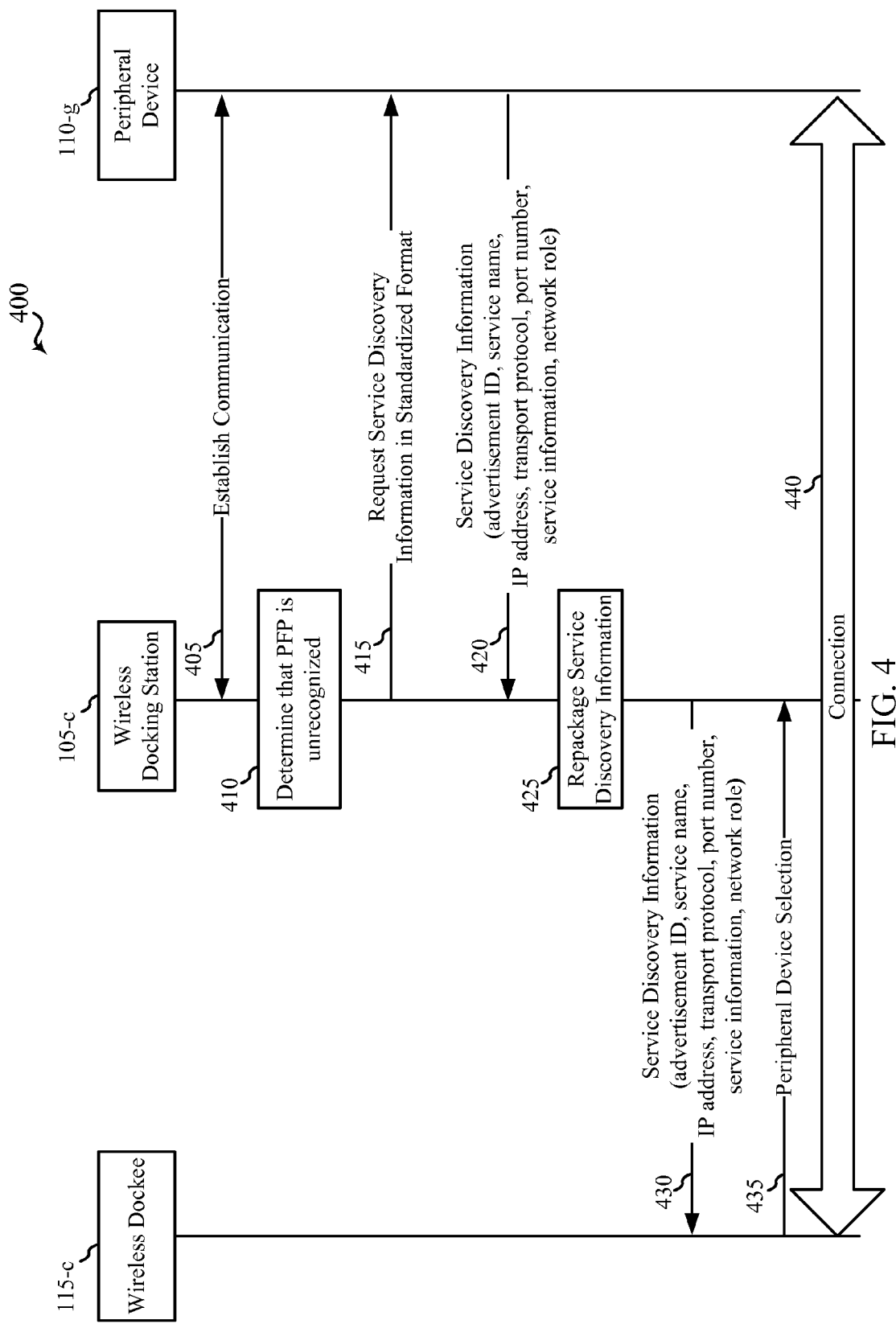
FIG. 4 shows a call flow diagram illustrating communication in a wireless communication system according to various aspects of the present disclosure.

Next, FIG. 4 depicts a call flow diagram 400 illustrating communication in a wireless communication system according to various embodiments. The diagram 400 may illustrate aspects of the systems 100 and 200 described with reference to FIGS. 1 and 2. The diagram 400 includes a wireless docking station 105-*c*, a peripheral device 110-*g*, and a wireless dockee 115-*c*. Each of these may be examples of corresponding devices of systems 100 and 200.

The wireless docking station 105-*c* may establish communication 405 with the peripheral device 110-*g*. The peripheral device 110-*g* may be external to or embedded in the wireless docking station 105-*c*. Upon establishing communication 405, the wireless docking station 105-*c* may determine that the peripheral device 110-*g* employs an unrecognized or unknown PFP 410. The wireless docking station 105-*c* may thus request service discovery information or parameters 415. If the peripheral device 110-*g* is embedded in the wireless docking station 105-*c*, the wireless docking station 105-*c* may also request parameters of the PFP that drive the use of the peripheral. The request 415 may be made in a standardized format known a priori to both the wireless docking station 105-*c* and the peripheral device 110-*g*. In response, the peripheral device 110-*g* may transmit service discovery information or parameters 420. An embedded peripheral device 110-*g* may also transmit additional driver parameters. The service discovery information 420 may include one or more of: a transport protocol, a port number, advertisement identification, a service name, a network or IP address, service information, network role, or other suitable parameters. In some embodiments, the service discovery information 420 includes a PFP name.

Each of the service discovery parameters may convey particular information about the peripheral device 110-*g*. By way of example, the transport protocol parameter indicates what transport protocol the peripheral device 110-*g* employs, and the port number indicates which IP port the peripheral device 110-*g* utilizes. The PFP name may be the name of an unrecognized PFP that the peripheral device 110-*g* utilizes. The advertisement identification may be an indication that the peripheral device 110-*g* is available for connection. The service name may indicate a name of the peripheral function the peripheral device 110-*g* offers. In some cases, the service information includes information about the peripheral function of the peripheral device 110-*g*. The network address may be an IP address of the peripheral device 110-*g*. And, in some embodiments, the network role is the intended role of the peripheral device 110-*g* in a device-to-device communication scenario. For example, the network role may indicate that the peripheral device 110-*g* intends to assume a master or slave role, as between it and another device.

In some embodiments, the wireless docking station 105-*c* repackages 425 the service discover information and then it transmits the service discovery information 430 to the wireless dockee 115-*c*. The wireless dockee 115-*c* may utilize the service discovery information to select a peripheral device 110, and the wireless dockee 115-*c* may indicate the peripheral device selection 435 to the wireless docking station 105-*c*. In some embodiments, the wireless docking station 105-*c* then facilitates a connection 440 between the wireless dockee 115-*c* and the peripheral device 110-*g*.

Figure 5:
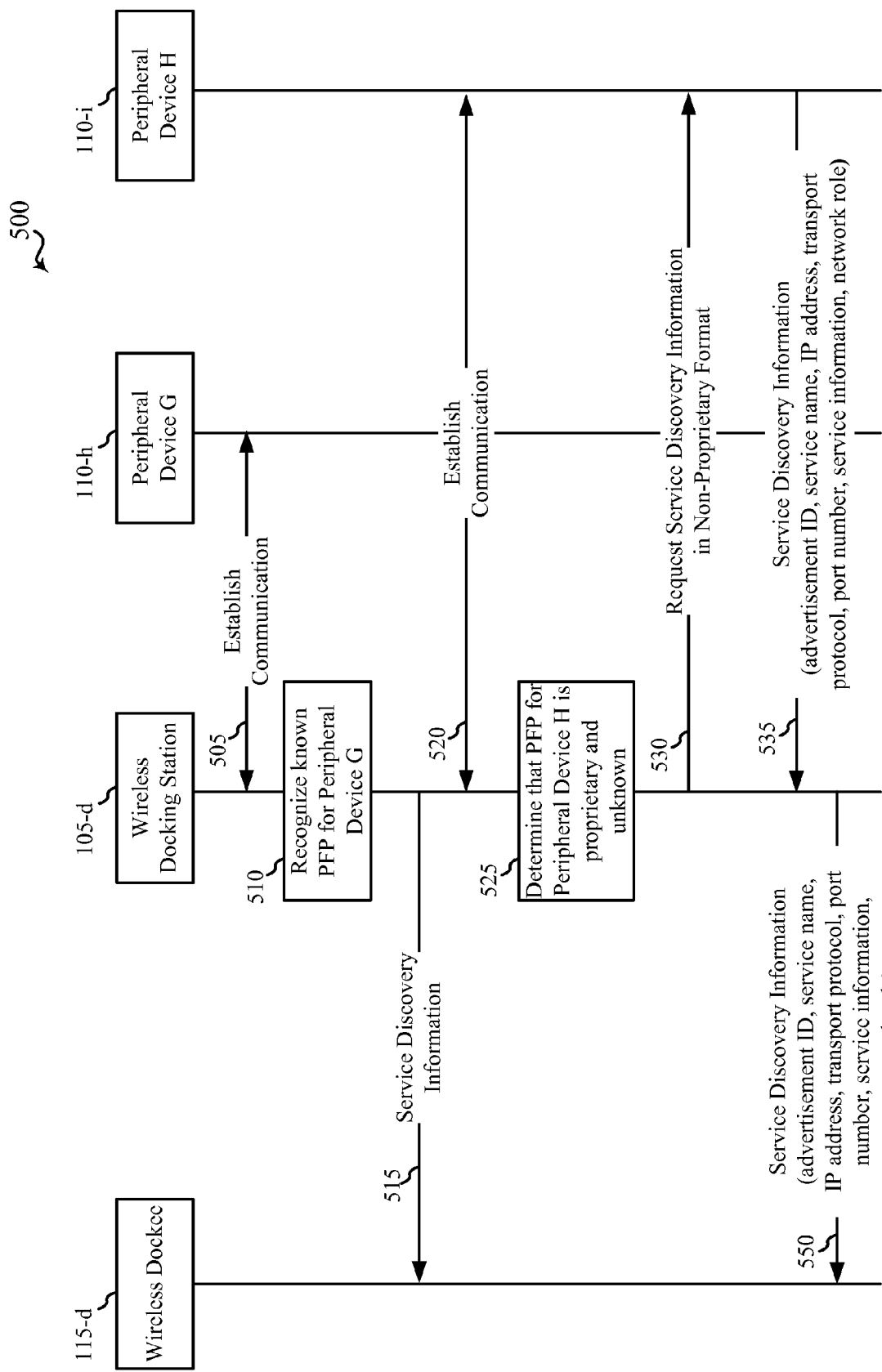
FIG. 5 shows a call flow diagram illustrating communication in a wireless communication system according to various aspects of the present disclosure.

FIG. 5 depicts a call flow diagram 500 illustrating communication in a wireless communication system according to various embodiments. The diagram 500 may illustrate aspects of the systems 100 and 200 described with reference to FIGS. 1 and 2. The diagram 500 includes a wireless docking station 105-*d*, peripheral devices 110-*h* and 110-*i*, and a wireless dockee 115-*d*. The peripheral devices 110-*h* and 110-*i* may be external to or embedded in the wireless docking station 105-*c*. Each of these may be examples of corresponding devices of systems 100 and 200.

The wireless docking station 105-*d* may establish communication 505 with the peripheral device 110-*h*. Upon establishing communication 505, the wireless docking station 105-*d* may recognize the PFP 510 that the peripheral device 110-*h* utilizes. The wireless docking station 105-*d* may thus convey service discovery information 515 to the wireless dockee 115-*d* according to the recognized PFP.

The wireless docking station 105-*d* may also establish communication 520 with the peripheral device 110-*i*. Upon establishing communication 520, the wireless docking station 105-*d* may determine that that the peripheral device 110-*i* employs an unrecognized or unknown PFP 525. The wireless docking station 105-*d* may thus request service discovery information or parameters 530. If the peripheral device 110-*i* is embedded in the wireless docking station 105-*d*, the wireless docking station 105-*d* may also request parameters of the PFP that drive the use of the peripheral device 110-*i*. The request 530 may be of a non-proprietary format, which, for example, is known a priori to both the wireless docking station 105-*d* and the peripheral device 110-*i*. In response, the peripheral device 110-*i* may transmit service discovery information or parameters 535. An embedded peripheral device 110-*i* may also transmit additional driver parameters. The service discovery information 535 may include one or more of: a transport protocol, a port number, a PFP name, advertisement identification, a service name, a network address, service information, network role, or other suitable parameters. The wireless docking station 105-*d* may, in turn, transmit the service discovery information 550 to the wireless dockee 115-*d*.

Figure 6:
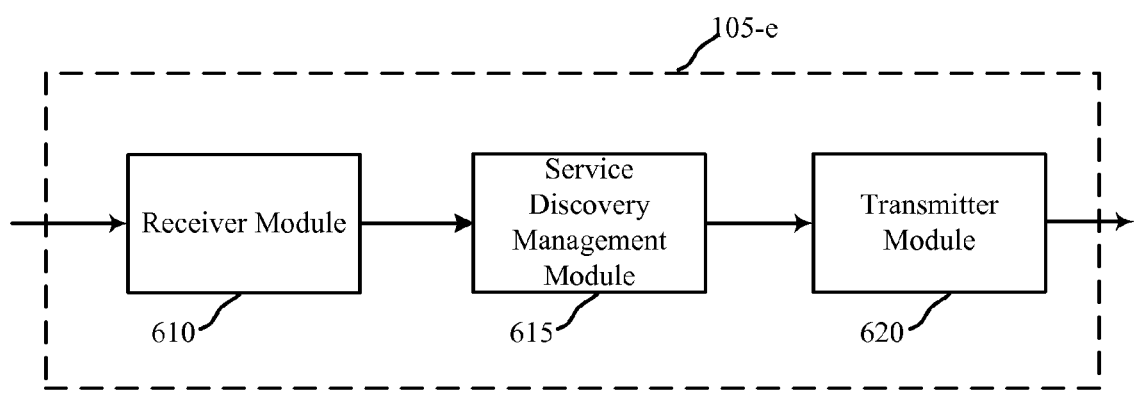
FIG. 6 shows a block diagram of a device configured for communication in a wireless network according to various aspects of the present disclosure.

Next, FIG. 6 depicts a block diagram of a device 105-*e* configured for communication in a wireless network according to various embodiments. The device 105-*e* may be a wireless docking station, and it may be an example of the wireless docking stations 105 described with reference to the preceding figures. The device 105-*e* may include a receiver module 610, a service discovery management module 615, and a transmitter module 620. Each of the modules may be in communication with one another. In some embodiments, the device 105-*e* includes a processor module (not shown).

The various modules of the device 105-*e* may be means for performing the function described herein. For instance, the transmitter module 620 may be configured to transmit a request for one or more service discovery parameters to a peripheral device. In some embodiments, the receiver module is configured to receive parameters from the peripheral device transmitted in response to the request. The service discovery management module 615 may be configured to package the received parameters as service discovery information. And, in some cases, the transmitter module 620 is further configured to transmit the service discovery information to a wireless dockee. The device 105-*e* may communicate with external peripheral devices and embedded peripheral devices.

In some embodiments, the service discovery management module 615 is configured to facilitate a connection between the wireless dockee and the peripheral device. The service discovery management module 615 may, in combination with the receiver module 610 and the transmitter module 620, receive peripheral input/output signals from a wireless dockee and transmit them to a peripheral device. Likewise, the device 105-e may receive input/output signals from a peripheral device and transmit them to a wireless dockee.

The components of the device 105-e may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 7:
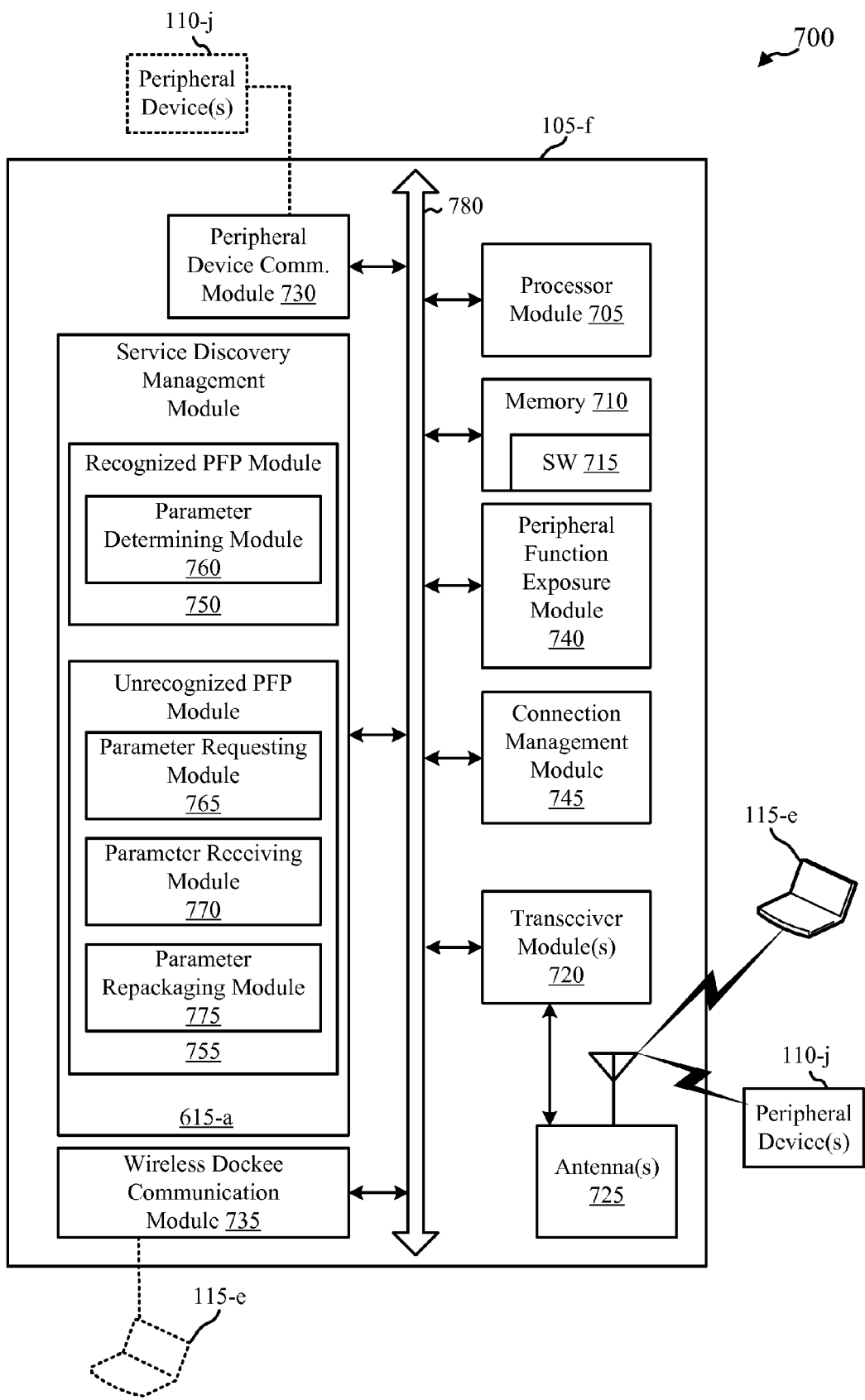
FIG. 7 shows a block diagram of a wireless communications system according to various aspects of the present disclosure.

Turning now to FIG. 7, which depicts a wireless communications system 700 according to various embodiments. The system 700 may include a wireless docking station 105-f, peripheral devices 110-j, and wireless dockees 115-e. The peripheral devices 110-j may be external to the wireless docking station 105-ft but in some cases the peripheral devices 110-j are embedded in the wireless docking station 105-f. The docking station 105-f may be an example of the devices 105 described with reference to the preceding FIGS. 1, 2, 3, 4, 5, and/or 6. The docking station 105-f may include a processor module 705, a memory module 710 (including software module 715), a transceiver module 720, antenna(s) 725, a peripheral device communication module 730, a wireless dockee communication module 735, a peripheral function exposure module 740, and a connection management module 745. In some embodiments, the transceiver module(s) 720 may be referred to as a transmitter.

The transceiver module 720, in conjunction with antenna (s) 725 may facilitate wireless transmission with wireless dockees 115-e and/or peripheral device(s) 110-j. Additionally or alternatively, the peripheral device communication module 730 may facilitate wireline communication with the peripheral devices 110-j. In some embodiments, the wireless dockee communication module 735 facilitates wireline communications with a wireless dockee 115-e. For example, a wireless dockee 115-e may be temporarily connected via wireline to the wireless docking station 105-f for certain synchronization operations.

The peripheral function exposure module 740 may identify or otherwise determine peripheral functions of peripheral devices 110-j. The peripheral function exposure module 740 may facilitate advertisement of peripheral functions available via the wireless docking station 105-f.

The connection management module 745 may facilitate connections between wireless dockees 115-e and peripheral devices 110-j. For example, the connection management module 745 may, in combination with the transceiver module 720, receive peripheral input/output signals from a wireless dockee and transmit them to a peripheral device. Likewise, the connection management module 745 may receive input/output signals from a peripheral device and transmit them to a wireless dockee.

In some embodiments, the wireless docking station 105-f includes a service discovery management module 615-a. The service discovery management module 615-a may perform substantially the same functions as the corresponding module described with reference to FIG. 6. By way of example, the service discovery management module 615-a determines whether a connected peripheral is using a recognized or unrecognized PFP. The service discovery management module 615-a may also include a recognized PFP module 750 and an unrecognized PFP module 755. The recognized PFP module 750 may further include a parameter determining module 760. In some cases, the recognized PFP module 750 is configured to operate when a connected peripheral employs a recognized PFP. For those peripherals employing recognized or known PFPs, the parameter determining module 760 may determine parameters for use by a wireless dockee in discovery of a peripheral.

The unrecognized PFP module 755 may include a parameter requesting module 765, a parameter receiving module 770, and/or a parameter repackaging module 775. These modules may alternatively be referred to as a parameter requester, a parameter receiver, and a parameter repackager, respectively. In some embodiments, the unrecognized PFP module 755 is configured to operate when a connected peripheral employs an unrecognized PFP. For those peripherals employing unrecognized or unknown PFPs, the parameter requesting module 765 may request service discovery parameters from the peripheral device, via the transceiver module 720, for example. The parameter receiving module 770 may receive service discovery parameters in response to the request. The parameter repackaging module 775 may package the received parameters and prepare them to be transmitted to a wireless dockee 115-e for use in peripheral discovery.

Operations of the service discovery management module 615-a may be further understood by reference to FIGS. 3-5. For example, the service discovery management module 615-a may be configured to implement a call flow sequence substantially similar to the call flow diagram 500.

The memory module 710 may include random access memory (RAM) and read-only memory (ROM). The memory module 710 may store computer-readable, computer-executable software/firmware code 715 containing instructions that are configured to, when executed, cause the processor module 705 to perform various functions described herein (e.g., requesting, receiving, and transmitting service discovery parameters, etc.). Alternatively, the software/firmware code 715 may not be directly executable by the processor module 705 but may be configured to cause a computer (e.g., when compiled and executed) to perform functions described herein. The processor module 705 may include an intelligent hardware device, e.g., a central processing unit (CPU), a microcontroller, an application-specific integrated circuit (ASIC), etc.

Each of the modules of the wireless docking station 105-f may be in communication with each other, for example via a communication bus 780.

Figure 8:
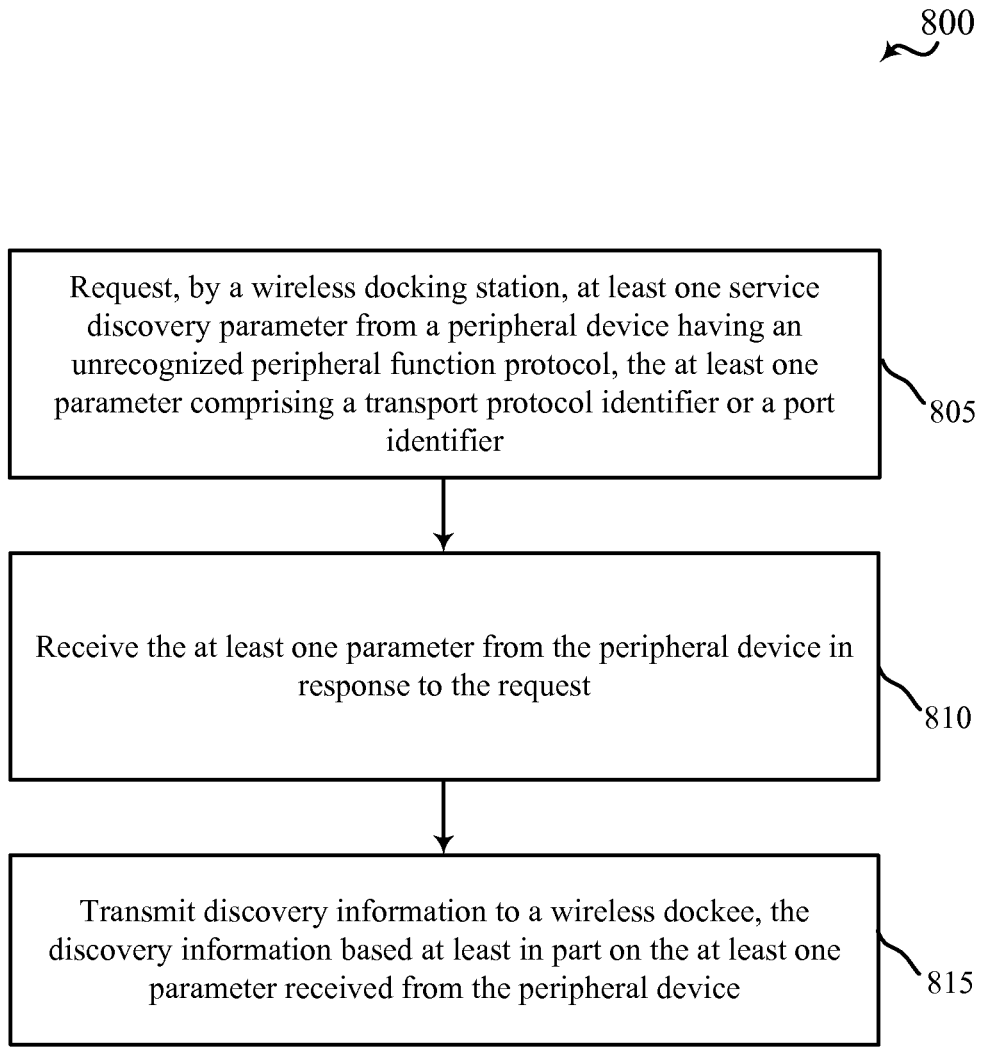
FIG. 8 shows a flowchart diagram of an illustrative method for wireless communications according to various aspects of the present disclosure.

FIG. 8 shows a flowchart diagram of an illustrative method 800 for wireless communications according to an aspect of the principles described above. The method 800 may be implemented by one or more of the wireless docking stations 105 described above with reference to the previous Figures. In certain examples, one or more of the wireless docking stations 105 of FIGS. 1-7; modules 610, 615, or 620 of FIG. 6; and/or modules 705, 710, 715, 720, 725, 730, 735, 740, 745, 750, 755, 760, 765, 770, 775, or 615-a of FIG. 7 may be means for performing the blocks 805, 810, 815 illustrated in connection with the method 800 of FIG. 8.

At block 805, a wireless docking station may request a service discovery parameter from a peripheral device having an unrecognized peripheral function protocol (PFP). The unrecognized PFP may be a proprietary PFP or other PFP with which the wireless docking is unfamiliar. The parameter may include a transport protocol identifier or a port identifier for the peripheral device. At block 810, the parameter may be received from the peripheral device in response to the request. At block 815, service discovery information may be transmitted to a wireless dockee. The service discovery information may be based at least in part on the parameter received from the peripheral device.

Figure 9:
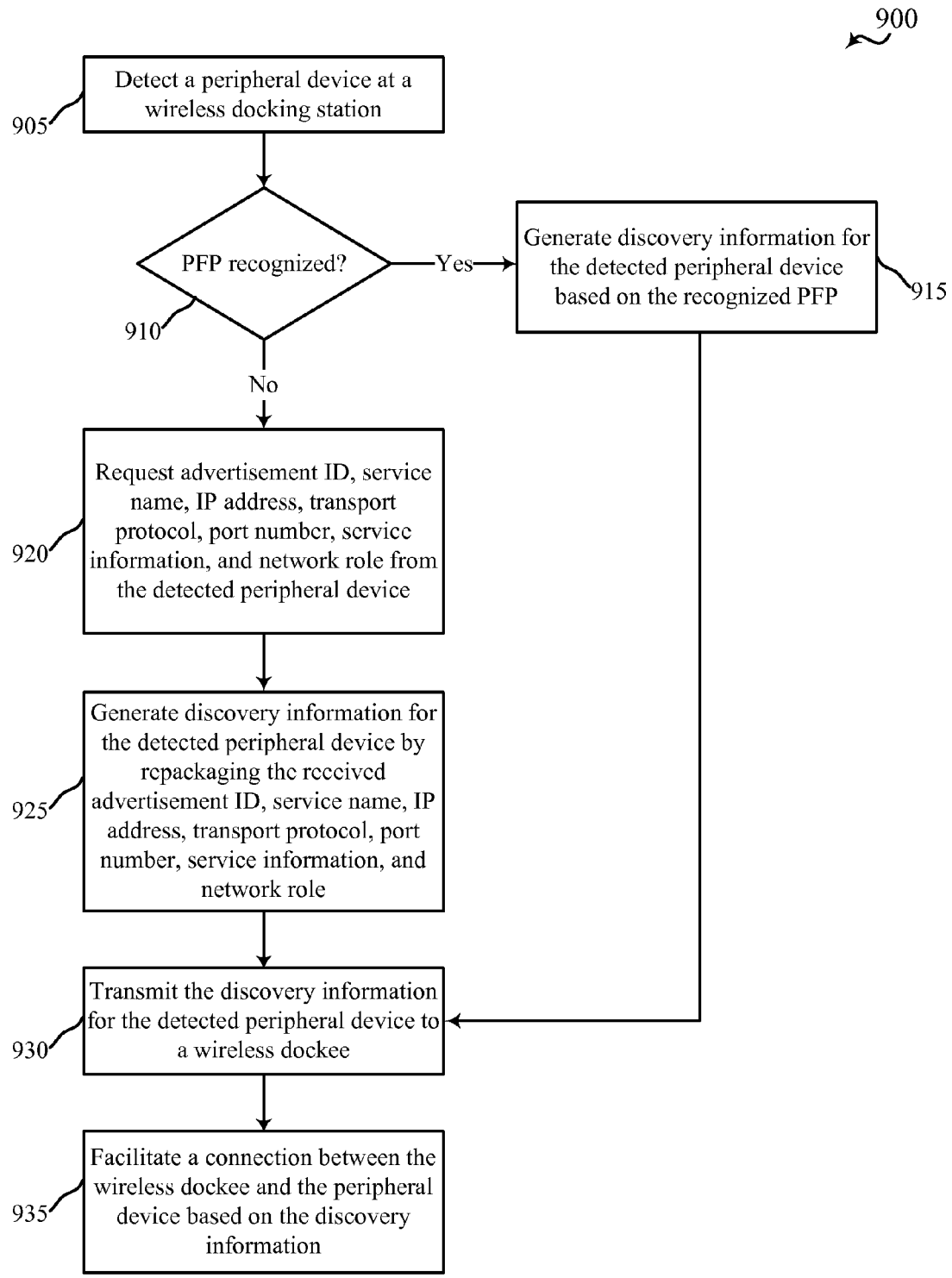
FIG. 9 shows a flowchart diagram of an illustrative method for wireless communications according to various aspects of the present disclosure.

FIG. 9 shows a flowchart diagram of an illustrative method 900 for wireless communications according to an aspect of the principles described above. The method 900 may be an example of the method 800 described above with reference to FIG. 8. The method 900 may be implemented by one or more of the wireless docking stations 105 described above with reference to the previous Figures. In certain examples, one or more of the wireless docking stations 105 of FIGS. 1-7; modules 610, 615, or 620 of FIG. 6; and/or modules 705, 710, 715, 720, 725, 730, 735, 740, 745, 750, 755, 760, 765, 770, 775, or 615-a of FIG. 7 may be means for performing the blocks 905, 910, 915, 920, 925, 930, 935 illustrated in connection with the method 900 of FIG. 9.

At block 905, a wireless docking station may detect a peripheral device. At block 910, the wireless docking station may determine whether a peripheral function protocol (PFP) employed by the peripheral device is recognized.

If the PFP is recognized (block 910, Yes), the wireless docking station may generate service discovery information at block 915 for the detected peripheral device based at least in part on known information about the recognized PFP and the detected peripheral device. The generated service discovery information for the detected peripheral device may be transmitted to a wireless dockee at block 930, and the wireless docking station may facilitate a connection between the wireless dockee and the peripheral device based at least in part on the service discovery information at block 935.

If the PFP is not recognized (block 910, No), the wireless docking station may request from the peripheral device one or more of: a PFP name, an advertisement identifier associated with the peripheral device, a service name associated with the peripheral device, an Internet Protocol (IP) address or other network address associated with the peripheral device, a transport protocol (e.g., User Datagram Protocol (UDP) or IP) associated with the peripheral device, a port number (e.g., an IP port) associated with the peripheral device, service information associated with the peripheral device, a network role associated with the peripheral device, or the like. At block 925, service discovery information for the detected peripheral device may be generated based at least in part on the requested parameter(s), as received from the peripheral device. At block 930, the service discovery information generated for the detected peripheral device may be transmitted to a wireless dockee, and at block 935 the wireless docking station may facilitate a connection between the wireless dockee and the peripheral device based at least in part on the service discovery information.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, the method comprising:
   determining that a peripheral function protocol (PFP) of a peripheral device is unrecognized, wherein the unrecognized PFP comprises a proprietary PFP;
   requesting at least one service discovery parameter from the peripheral device having the unrecognized PFP, the at least one service discovery parameter comprising a transport protocol identifier or a port identifier;
   receiving the at least one service discovery parameter from the peripheral device in response to the requesting; and
   transmitting service discovery information , the service discovery information based at least in part on the at least one service discovery parameter received from the peripheral device.

2. The method of claim 1, further comprising:
   generating the service discovery information by repackaging the received at least one service discovery parameter.

3. The method of claim 1, further comprising:
   facilitating a connection between a wireless dockee and the peripheral device based at least in part on the service discovery information.

4. The method of claim 1, wherein the at least one service discovery parameter from the peripheral device comprises both the transport protocol identifier and the port identifier.

5. The method of claim 1, wherein the at least one service discovery parameter from the peripheral device further comprises at least one of:
   a PFP name of an unrecognized PFP associated with the peripheral device, an advertisement identifier associated with the peripheral device, a service name associated with the peripheral device, a network address associated with the peripheral device, application service information data associated with the peripheral device, or a network role associated with the peripheral device.

6. A wireless docking station apparatus, comprising:
   a service discovery manager to determine that a peripheral function protocol (PFP) of a peripheral device is unrecognized, wherein the unrecognized PFP comprises a proprietary PFP;
   a parameter requester to generate a request for at least one service discovery parameter of the peripheral device having the unrecognized PFP, the at least one service discovery parameter comprising a transport protocol identifier or a port identifier;
   a parameter receiver to receive the at least one service discovery parameter from the peripheral device in response to the request from the parameter requester; and
   a transmitter to transmit service discovery information to a wireless dockee, the service discovery information based at least in part on the at least one service discovery parameter received from the peripheral device.

7. The wireless docking station apparatus of claim 6, further comprising:
   a parameter repackager to generate the service discovery information by repackaging the at least one service discovery parameter received from the peripheral device.

8. The wireless docking station apparatus of claim 6, further comprising:
   an antenna to facilitate a connection between the wireless dockee and the peripheral device based at least in part on the service discovery information.

9. The wireless docking station apparatus of claim 6, wherein the at least one service discovery parameter from the peripheral device comprises both the transport protocol identifier and the port identifier.

10. The wireless docking station apparatus of claim 6, wherein the at least one service discovery parameter from the peripheral device further comprises at least one of:
    a PFP name of an unrecognized PFP associated with the peripheral device, an advertisement identifier associated with the peripheral device, a service name associated with the peripheral device, a network address associated with the peripheral device, application service information data associated with the peripheral device, or a network role associated with the peripheral device.

11. A wireless docking station apparatus, comprising:
    means for determining that a PFP of a peripheral device is unrecognized, wherein the unrecognized PFP comprises a proprietary PFP;
    means for generating a request for at least one service discovery parameter of the peripheral device having the unrecognized PFP, the at least one service discovery parameter comprising a transport protocol identifier or a port identifier;
    means for receiving the at least one service discovery parameter from the peripheral device in response to the request; and
    means for transmitting service discovery information to a wireless dockee, the service discovery information based at least in part on the at least one service discovery parameter received from the peripheral device.

12. The wireless docking station apparatus of claim 11, further comprising:
    means for generating the service discovery information by repackaging the at least one service discovery parameter received from the peripheral device.

13. The wireless docking station apparatus of claim 11, wherein the at least one service discovery parameter from the peripheral device comprises both the transport protocol identifier and the port identifier.

14. A computer program product, comprising:
    a non-transitory computer-readable medium comprising computer-readable program code embodied thereon, the computer-readable program code to cause at least one processor to:
    determining that a PFP of a peripheral device is unrecognized, wherein the unrecognized PFP comprises a proprietary PFP;
    generate a request for at least one service discovery parameter of the peripheral device having the unrecognized peripheral function protocol (PFP), the at least one service discovery parameter comprising a transport protocol identifier or a port identifier;

receive the at least one service discovery parameter from the peripheral device in response to the request; and transmit service discovery information, the service discovery information based at least in part on the at least one service discovery parameter received from the peripheral device.

15. The computer program product of claim 14, wherein the computer-readable program code is further to cause the at least one processor to:

generate the service discovery information by repackaging the received at least one service discovery parameter.

16. The computer program product of claim 14, wherein the at least one service discovery parameter from the peripheral device comprises both the transport protocol identifier and the port identifier.

* * * * *